(12) United States Patent
Venturi

(10) Patent No.: US 8,055,858 B2
(45) Date of Patent: Nov. 8, 2011

(54) METHOD FOR PROTECTING EXPOSED DATA DURING READ/MODIFY/WRITE OPERATIONS ON A SATA DISK DRIVE

(75) Inventor: Ronald J. Venturi, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/023,580

(22) Filed: Jan. 31, 2008

(65) Prior Publication Data

US 2009/0204756 A1 Aug. 13, 2009

(51) Int. Cl.
*G06F 12/00* (2006.01)
*G06F 13/00* (2006.01)
*G06F 13/28* (2006.01)
(52) U.S. Cl. .. 711/154; 711/112; 711/155; 711/E12.001
(58) Field of Classification Search .................. 711/111, 711/112, 154, 155, E12.001, E12.103
See application file for complete search history.

(56) References Cited

U.S. PATENT DOCUMENTS

| | | | |
|---|---|---|---|
| 6,021,463 A * | 2/2000 | Belser | 711/114 |
| 6,742,079 B1 * | 5/2004 | Kuschak | 711/103 |
| 7,097,535 B2 | 8/2006 | Glashauser et al. | |
| 7,101,056 B2 | 9/2006 | Pare | |
| 7,219,259 B2 | 5/2007 | Batchelor et al. | |
| 7,606,364 B1 * | 10/2009 | Shih | 380/42 |
| 7,774,540 B2 * | 8/2010 | Han et al. | 711/112 |
| 2006/0031714 A1 * | 2/2006 | Batchelor et al. | 714/14 |
| 2008/0091877 A1 * | 4/2008 | Klemm et al. | 711/114 |

* cited by examiner

*Primary Examiner* — Hetul Patel
*Assistant Examiner* — Matthew Chrzanowski
(74) *Attorney, Agent, or Firm* — Scully, Scott, Murphy & Presser, P.C.; Randall Bluestone, Esq.

(57) ABSTRACT

A method and system for saving and retrieving data includes saving data in data storage fields of a data storage device in a computer. A back-up data storage field is selected in the data storage device. A data changing operation including new data is initiated on specified data saved in a current data storage field. A copy of all the data stored in boundary data storage fields is copied and stored in the back-up data storage field before changing the current data to provide data retrieval if the data is unrecoverable in the current data storage field, when a loss of power to the data storage device occurs.

18 Claims, 2 Drawing Sheets

US 8,055,858 B2

METHOD FOR PROTECTING EXPOSED DATA DURING READ/MODIFY/WRITE OPERATIONS ON A SATA DISK DRIVE

FIELD OF THE INVENTION

The present invention relates to methods and devices for saving data on a data storage device or disk drive in a computer, and more specifically, relates to backing-up data before a data changing operation or process on the data storage device or disk drive in a computer.

BACKGROUND OF THE INVENTION

Serial advanced technology attachment (SATA) disk drives use a rigid 512-bytes per sector format, however, many applications require a larger block size e.g. 520-byte, 524-byte, 528-byte, etc. Thus, to use SATA drives with these application requires a conversion process in which the larger block sizes are "mapped" across a number of 512-byte SATA sectors. Well-known mapping algorithms arrange the larger "logical" blocks across contiguous 512-byte "physical" sectors, so that each logical block will start and end at some offset into a physical sector. When logical blocks are being accessed by the application, it is necessary to calculate the physical sectors which contain the required logical blocks, and also the offsets which mark the start and end of the logical blocks within the physical sectors. For read accesses, it is a simple matter to locate and read the appropriate physical sectors, then discard the "unwanted" data, i.e., data before the starting offset or after the ending offset. However for write accesses it is not possible to simply discard the "unwanted" data, because that data belongs to adjacent logical blocks and must not be altered when the physical sectors are written. Thus, for write operations it is necessary to first read the required physical sectors, then modify only the portion of those sectors which represent the logical blocks being written, and then write the physical sectors back to the media, This read/modify/write process (r/m/w) is a known feature in disk drive architecture, and is currently implemented in many applications.

A drawback to the current r/m/w operation is that a power loss during the r/m/w operation can cause unrecoverable data loss. This possibility occurs during every r/m/w operation, at the point where the two part-modified sectors at the start and end of the logical blocks (i.e., the "boundary" sectors) are being written to the media. If the storage system suffers a power failure while the disk drive is writing one of the boundary sectors, that sector will be corrupted, which results in the data from two different logical blocks being corrupted. For one of these logical blocks (the one which was being written by the application), this is a recoverable situation because the application will have retained a copy of the data being written, and can save it elsewhere if it does not receive a confirmation from the storage system. However, for the other logical block there is no such recovery. The application was not involved in writing that logical block and does not hold a copy of its data, and thus, that data is lost.

There are several methods of avoiding the potential problem, but all have drawbacks and disadvantages. Most methods rely on detecting the "imminent power loss warning" provided by the system. Typically, this warning alerts devices that they have only a few milliseconds to complete vital operations before power is lost. A SATA adapter which has just issued a r/m/w operation to the drive cannot know if that write will complete in the time available, so it must assume that data on the media may become corrupted as described above. The SATA adapter will use the available time to save data which is exposed, but to save the two boundary sectors in non-volatile memory (i.e. 1024 bytes) requires more time than is available before power loss, so the SATA adapter cannot guarantee to save the exposed data. To be certain of avoiding this exposure, the SATA adapter may save the boundary sectors to nonvolatile memory on every r/m/w operation, however, this adds a long delay in the r/m/w process and substantially reduces the write performance. Another solution uses battery backup systems which allow current write operations to complete if the main system power is lost, however, this is very expensive to implement, and significantly reduces the cost benefits of using SATA drives.

Therefore, it would be desirable to provide a r/m/w operation which guarantees boundary data cannot be lost due to a power loss event. It would further be desirable for the operation to be inexpensive to implement (since a main benefit of using SATA drives is the relatively low cost), and be efficient in operation (since there is already a performance penalty imposed by the standard r/m/w process, a further performance penalty would be undesirable).

SUMMARY OF THE INVENTION

A method for retrieving data includes: saving data in current data storage fields of a data storage device in a computer; receiving new data for modifying specified saved data in the current data storage fields; analyzing data storage space in storage fields of the data storage device; selecting a back-up data storage field in the data storage device; reading the specified saved data in the current data storage fields on the data storage device including the specified saved data stored in part of at least one boundary current data storage field; copying all data in the boundary current data storage field; modifying the read specified saved data including the copied data from the boundary current data storage field resulting in new data which includes the boundary current data storage field; storing a copy of the new data corresponding to the boundary current data storage field in the back-up data storage field; and changing the specified saved data at the current data storage fields and the boundary current data storage field including the new data after storing the new data. In another aspect of the method, storing the new data is completed in the same revolution of a disk drive with the copying of the specified saved data. Further, storing the copy of the new data may be completed between the steps of reading the specified saved data and changing the specified saved data. The method may further include: retrieving the copy of the new data corresponding to the boundary current data storage field in the back-up data storage field after losing power during the step of changing the specified saved data; and re-writing the new data to the boundary current data storage field. Additionally the method may further include: during a power interruption to the data storage device, writing to flash storage the back-up data storage field location in the data storage device; and after restoring power to the data storage device, detecting that the power interruption occurred, and recovering the copy of the new data in the back-up data storage field. In another aspect of the method, the data storage device is a hard drive having a period of revolution, and the method further includes: during the same revolution of the hard drive, completing the steps of reading the specified saved data, copying all the data in the boundary current data storage field, and storing the copy of the new data; and during the next revolution of the hard drive, changing the specified saved data. Changing of the specified saved data may include adding data or modifying the specified data. The specified saved data may include data blocks in the current data storage fields and at least one associated data block in the boundary current data storage field. The boundary current data storage field may be adjacent the current data storage field on the data storage device. The step of changing the specified saved data may be part of a read/modify/write operation. The method may further include the current data storage fields including corresponding sectors of the data storage device, and the sectors storing the specified saved data having blocks of data, and at least one block of data for storing the specified saved data being stored in the boundary current data storage field with unassociated data to the specified saved data. The step of saving data may include using data blocks in the current data storage fields, and data blocks are stored in at least two adjacent data storage fields to the current data storage fields in the data storage device.

In another aspect of the invention, a data retrieval system includes a data storage device in a computer, and a plurality of data storage fields for saving data in the data storage device using the computer. The data is saved using a computer program embodied in computer readable medium in the computer being readable by the computer. A plurality of current data storage fields have specified data, and at least one boundary data storage field has part of the specified data and unassociated data to the specified data. At least one back-up data storage field in the data storage device for storing a copy of all the data in the boundary data storage field including the specified data and the unassociated data. The specified data may include data blocks in the current data storage fields and at least one associated data block in the boundary data storage field of the data storage device. The boundary data storage field may be adjacent the current data storage fields on the data storage device. The copy of all the data in the boundary data storage field may be retrieved after losing power to the data storage device during a data changing operation. The data changing operation may include a read/modify/write operation. The current data storage fields may include sectors of the data storage device, and the sectors store the specified data having blocks of data, and at least one block of data for storing the specified data being stored in a boundary sector of the data storage device. The saved specified data may be stored using data blocks stored in at least two adjacent boundary data storage fields to the current data storage fields in the data storage device.

In another aspect of the invention, a computer program product for use with a computer includes a computer readable medium having recorded thereon a computer program or program code for causing the computer to perform a method for storing and retrieving data, the method comprising: saving data in current data storage fields of a data storage device in a computer; receiving new data for modifying specified saved data in the current data storage fields; analyzing data storage space in storage fields of the data storage device; selecting a back-up data storage field in the data storage device; reading the specified saved data in the current data storage fields on the data storage device including the specified saved data stored in part of at least one boundary current data storage field; copying all data in the boundary current data storage field; modifying the read specified saved data including the copied data from the boundary current data storage field resulting in new data which includes the boundary current data storage field; storing a copy of the new data corresponding to the boundary current data storage field in the back-up data storage field; and changing the specified saved data at the current data storage fields and the boundary current data storage field including the new data after storing the new data.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
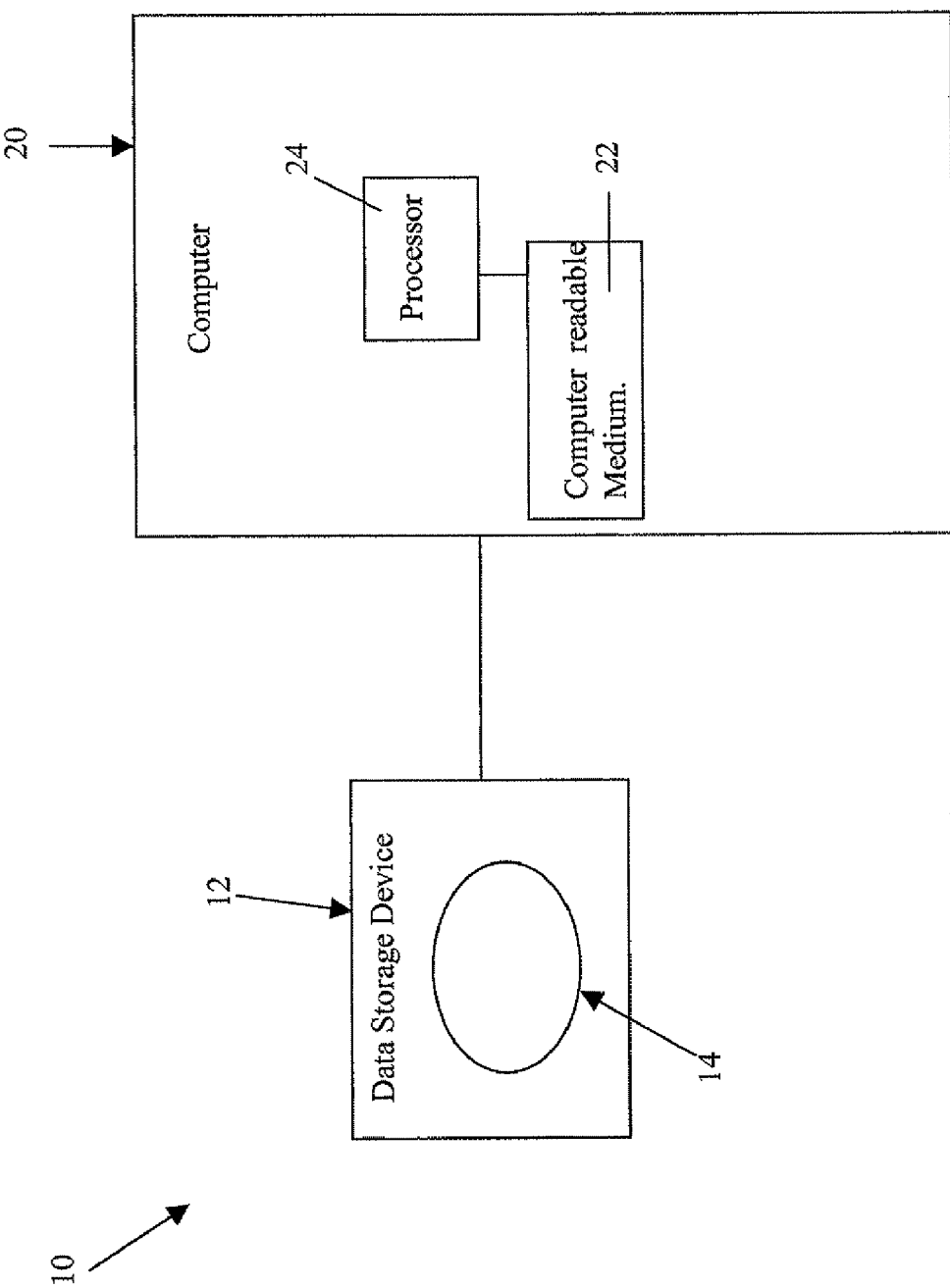
FIG. 1 is a block diagram according to an embodiment of the invention depicting a data storage device and a computer.
Figure 2:
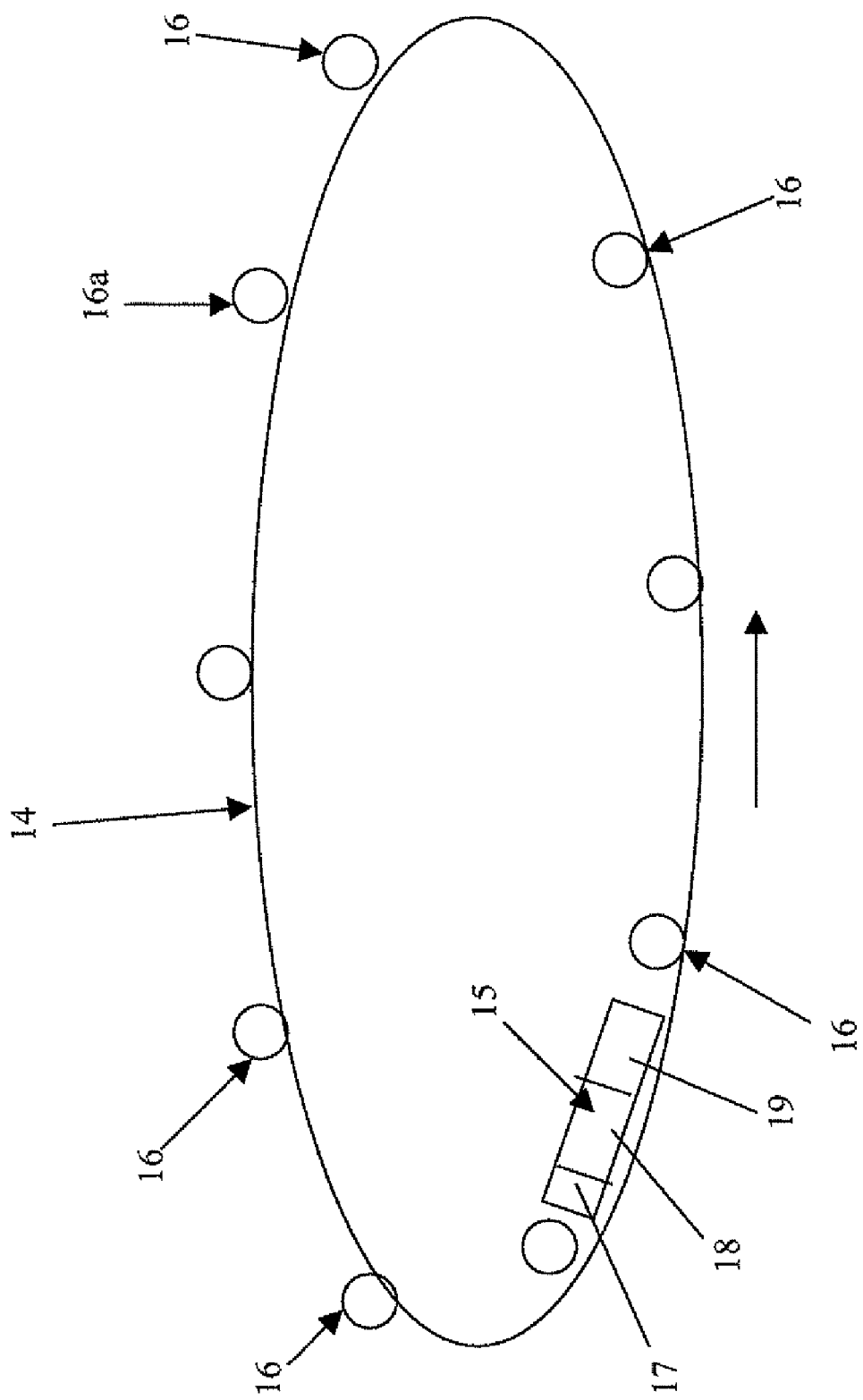
FIG. 2 is a block diagram of a disk cylinder of the data storage device shown in FIG. 1 depicting back-up locations for storing data, and a current data storage field or location.

Referring to FIGS. 1 and 2, an illustrative embodiment of a data saving/storage system and method 10 according to the present invention includes a data storage device 12 embodied as a disc drive having a disk drive cylinder 14 for saving/storing and retrieving data. The data storage device 12 and thereby the disk cylinder 14 are electrically connected to a computer 20 either using a wire or wirelessly and may be external to the computer 20, as shown in FIG. 1, or may be internally located in the computer system 20. A plurality of data storage fields 16 are located in the disk cylinder 14 for saving data on the disk cylinder 14 using the computer 20, as shown in FIG. 2. The data is saved using a computer program embodied in computer readable medium 22, and is readable by the computer 20 using a processor 24 in the computer 20. A specified data current storage field embodied as a read/modify/write location 15 is positioned in the disk cylinder 14, for example, in a current data storage field embodied as a sector, or a collection of sectors on the disk cylinder 14. More specifically, for example, sectors 17, 18, and 19 are shown in FIG. 2, where 17 and 19 are boundary/adjacent sectors to sector 18. A back-up data storage field 16a in the disk cylinder is used to store a copy of the data stored in the boundary sectors 17, 19 before changing the specified data saved in the sectors 17, 18, 19, in one embodiment, during a read/modify/write operation.

In the embodiment shown in FIG. 2, the specified data includes data blocks saved at the location 15 which includes saving data blocks using all of the data space in sector 18 but only part of the data space in boundary sectors 17 and 19. The partially used additional data storage fields/sectors 17, 19 may be adjacent the sector 18 on the data storage device, or may be spaced from the sector 18.

More specifically, the present invention inserts additional steps into the known read/modify/write operation described below. Specifically, a known write operation, which in the example below includes the blocks at the location 15 would include the following steps:

1. Calculating physical sectors which contain the blocks of 524-byte data, which in this example is the location 15;
2. Issuing a read operation for the sectors indicated, wherein the data is read when the location 15 reaches read/write heads;
3. Modifying the data within the appropriate offsets/specifications instructed by the computer 20, i.e., overlay new data; and
4. Issuing a write operation for the modified sectors, wherein data is written back to the media of the data storage field 15 after a complete revolution of the disk.

Thus, if a power loss occurs during the operation to write the data storage field 15, the associated boundary sectors 17 and 19 may become corrupted. Since boundary sectors contain data for adjacent blocks, the incomplete write to data storage field 15 will have inadvertently caused data loss in adjacent blocks.

The present invention solves the above problem by modifying the sector-mapping algorithm to produce a number of evenly spaced reserved sectors, and by inserting additional steps into the known read/modify/write operation, as described below. Thus, the read/modify/write method according to the present invention includes the following steps:

1. Calculating physical sectors which contain the blocks of 524-byte data, which in this example is the location 15;
2. Issuing a read operation for the sectors indicated, wherein the data is read when the location 15 reaches read/write heads;
3. Modifying the data within the appropriate offsets/specifications instructed by the computer 20, i.e., overlay new data;
4. Calculating the optimum back-up storage field 16a (or reserved location), which may be approximately one half revolution away from the location 15, as shown in FIG. 2;
5. Issuing a write of the new data of the two boundary sectors or logical blocks 17, 19 at the reserved location or back-up storage field 16a. The new data in the boundary sectors 17, 19 is written on the same revolution of the disk cylinder 14 as the current data in the location 15; and
6. Issuing a write operation for the modified sector or field 15. The new data is written to the current location field 15 after a complete revolution of the cylinder 14.

Thus, using the method above of the present invention, the new data for boundary sectors 17, 19 is copied to the reserved into a "reserved" location on the disk cylinder 14. Thereby, on every read/modify/writeboundary/write operation, the disk drive has a "back-up" copy of the boundary sectors, which can subsequently be recovered if the originals are corrupted during the write step which follows. One advantage of the invention is that the new read/modify/writeboundary/write (r/m/wb/w) operation takes no longer than the known r/m/w process, i.e., there is no performance disadvantage. This is achieved by providing multiple options for the reserved location 16 across every disk drive cylinder 14, so that the writeboundary step will always find an appropriate location close to the actual writing location 15, and the r/m/wb/w process is completed in a single revolution of the disk drive. This solution may be implemented in firmware and is easily adapted to existing designs, as well as, adding nothing to the product cost. For example, when the present invention is used in a SATA drive adapter, it allows SATA drives to achieve the power-loss protection which is normally associated with more expensive server-class drives.

In one embodiment of the invention, as described more specifically below, the boundary sector rewrite method of the present invention protects, at-risk, 524 byte data blocks during Read/Modify/Write operations on a 512-bytes per sector SATA drive. Data in 524-byte blocks is illustrated in Chart 1 below as B1 to B16. This data is mapped (recorded to specified data storage locations) onto the SATA drive in a series of 512-byte sectors, shown as S1 to S17 in Chart 1 below, where each B block (B1-B16) occupies slightly more than one S block (S1-S17).

CHART 1

| B1 | B2 | B3 | B4 | B5 | B6 | B7 | B8 | B9 | B10 | B11 | B12 | B13 | B14 | B15 | B16 |
|----|----|----|----|----|----|----|----|----|-----|-----|-----|-----|-----|-----|-----|

| S1 | S2 | S3 | S4 | S5 | S6 | S7 | S8 | S9 | S10 | S11 | S12 | S13 | S14 | S15 | S16 | S17 |
|----|----|----|----|----|----|----|----|----|-----|-----|-----|-----|-----|-----|-----|-----| location 16a during step 5. Thereby, if a power loss occurs during this write, or during the subsequent write at step 6, at least one correct copy of the boundary data remains intact on the media, i.e., the disk cylinder 14.

In one embodiment according to the present invention, a sector mapping algorithm can be modified to yield two reserved sectors at regular intervals across the disk surface. On serial advanced technology attachment (SATA) drives there are typically 6,000 to 12,000 sectors per cylinder. In one example, two reserved sectors are allocated for every 1024 blocks of 524-byte data, yielding on average nine (9) reserved locations on every cylinder. This reduces the capacity available to the user, but by less than 0.2%, which is negligible. By having pairs of reserved sectors, shown as 16 in FIG. 2, it is always possible to select a convenient pair to use as boundary sector backup locations on any give read/modify/write operation. Thus, when using this present invention to save the boundary data to reserved locations on the disk, if a SATA adapter detects an imminent loss of power, instead of having to save all 1024 bytes of the boundary sectors to non-volatile memory, it has to save only 12 bytes, 4 each to identify the boundary sectors and the reserved sector locations. This is easily achievable within a warning time for power failure. On the next power up of the drive, the SATA adapter can check non-volatile memory for evidence of a corrupted write, and can complete the data recovery at that point.

Thus, the present invention inserts additional steps into the known read/modify/write operation described above, to provide a read/modify/writeboundary/write operation or process having a writeboundary step writing the two boundary sectors For example, when writing the six blocks B7 to B12, the SATA adapter first reads the seven sectors S7 to S13, modifies the data which corresponds to the six blocks being written, then writes the seven sectors back to the drive (S7 to S13). The sectors S7 and S13 also contain data which belongs to blocks B6 and B13, so S7 and S13 are known as the boundary sectors. The data for blocks B6 and B13 is also being re-written on the disk, even though these blocks were not part of the original six-block write operation. Thus, any failure during the re-write of the boundary sectors can cause collateral damage to adjacent data blocks.

Regarding allocating reserved sectors on the SATA disk, in a 524 to 512 mapping, 128 blocks can be mapped into 131 sectors. Thus, if the Chart 1 is extended to the right, the first byte of B129 would line up with the first byte of S132, as shown in Chart 2.

CHART 2

| B129 | B130 | B131 | B132 | B133 | B134 |
|------|------|------|------|------|------|

| S132 | S133 | S134 | S135 | S136 | S137 | S138 | S139 |
|------|------|------|------|------|------|------|------|

Since the blocks/sectors are re-aligned at sector S132 on the drive, there is an opportunity to skip a couple of sectors and resume the mapping at S134, leaving S132 and S133 as reserved (R) sectors, as shown in Chart 3.

CHART 3

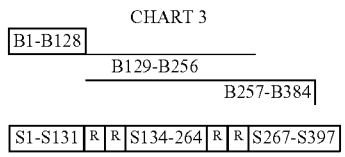

Thus, the mapping could allocate reserved sectors after every 131 data sectors, or less frequently if appropriate.

Regarding modifying the Read/Modify/Write process to save the boundary sectors, to Write one or more 524-byte blocks, the SATA adapter has to calculate the starting and ending 512-byte sectors which contain the required 524-byte blocks. The SATA adapter accomplishes this by reference to the mapping algorithm shown above, in Chart 1. Once the SATA adapter has identified the span of sectors involved, the SATA adapter starts a Read/Modify/Write process to complete the original Write operation.

In a normal read/modify/write operation, the SATA adapter will read the span of sectors from the disk, modify the relevant write data as required, and re-write the same span of sectors. Since this is a standard disk drive, the write operation has to wait until the drive makes a complete revolution, in order to access the same span of sectors as was read. On a SATA drive, the rotational speed is 7200 RPM so one revolution will take approx 8.3 msec (milliseconds).

Referring to Chart 1, for a 6-block Write operation (B7 to B12), the SATA adapter would proceed as follows, in Chart 4:

CHART 4

| msec | SATA adapter operations |
|---|---|
| 00 | issue SATA Read (7 sectors) |
| 01 | |
| 02 | modify data in sectors S7 to S13 |
| 03 | |
| 04 | |
| 05 | |
| 06 | |
| 07 | |
| 08 | issue SATA Write (7 sectors) |

The final operation of the process is the SATA Write at msec 08, in Chart 4. If there is a power failure while this write is being executed which results in sector S7 or S13 becoming unreadable, then data from the adjacent 524-byte blocks (B6 and B13) will be lost. These blocks were not part of the original Write operation (B7 to B12) and so the data cannot be regenerated by repeating the Write operation which failed.

The present invention protects the data in the boundary sectors before starting the SATA Write operation by saving the two sectors containing 1024 bytes of data in another (reserved) location on the disk, within a few msecs. The present invention is particularly advantageous, as writing the same 1024 bytes of data to FLASH can take up to 50 msec, and thus is not an option for saving the data during the same revolution of the disk, which takes only 8.3 msec. According to the present invention, the data can be saved onto the drive once a convenient reserved location is chosen and encountered on the way back around to the starting point of the Write operation. If the boundary sectors are saved before attempting to write the whole of the modified span, then there is no data at risk from a power failure. If a power failure is signaled during the SATA Write at msec 08 (Chart 5), the SATA adapter has enough time to write to FLASH the locations of the reserved sectors used to save the boundary data, since that write to FLASH includes only 12 bytes instead of 1024. On the next power-on of the drive, the SATA adapter can detect from the FLASH that a power failure has occurred, and any lost data can be recovered by following the FLASH pointer to read and restore the saved copy of the data on the drive.

Thereby, the standard Read/Modify/rite process is amended, according to the present invention, as follows, in Chart 5 below:

CHART 5

| msec | SATA adapter operations | Additional Operations |
|---|---|---|
| 00 | issue SATA Read (7 sectors) | |
| 01 | | |
| 02 | modify data in sectors S7 to S13 | |
| 03 | | |
| 04 | | |
| 05 | | SATA Write (S7 and S13 only) at a convenient reserved sector location |
| 06 | | |
| 07 | | |
| 08 | issue SATA Write (7 sectors) | If power warning is signaled, save reserved sector details in FLASH |

While the present invention has been particularly shown and described with respect to preferred embodiments thereof it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. method for retrieving data, comprising:
   saving data in current data storage fields of a data storage device in a computer;
   receiving additional data for modifying specified saved data in the current data storage fields;
   analyzing data storage space in storage fields of the data storage device;
   selecting a back-up data storage field location in the data storage device;
   reading the specified saved data in the current data storage fields on the data storage device including the specified saved data stored in part of a boundary current data storage field;
   copying all data in the boundary current data storage field;
   modifying the read specified saved data including the copied data from the boundary current data storage field resulting in new data which includes the boundary current data storage field;
   storing a copy of the new data corresponding to the boundary current data storage field in the back-up data storage field location;
   changing the specified saved data at the current data storage fields and the boundary current data storage field including the new data after storing the new data;
   copying the specified saved data within a revolution of a disk drive; and
   storing the copy of the new data within the revolution of the disk drive with the copying of the specified saved data;
   wherein the data storage device is a hard drive having a period of revolution, and the method further includes the steps of:
   during the period of revolution of the hard drive, completing the steps of reading the specified saved data, copying all the data in the boundary current data storage field, and storing the copy of the new data; and
   during a next revolution of the hard drive, changing the specified saved data.

2. The method of claim 1, wherein storing the copy of the new data is completed between the steps of reading the specified saved data and changing the specified saved data.

3. he method of claim 1, further comprising:
retrieving the copy of the new data corresponding to the boundary current data storage field in the back-up data storage field after losing power during the step of changing the specified saved data;
and re-writing the new data to the boundary current data storage field.

4. he method of claim 3, further including:
during a power interruption to the data storage device, writing to flash storage the back-up data storage field location in the data storage device; and
after restoring power to the data storage device, detecting that the power interruption occurred, and recovering the copy of the new data in the back-up data storage field.

5. he method of claim 1, wherein the changing of the specified saved data includes adding data or modifying the specified data.

6. he method of claim 1, wherein the specified saved data includes data blocks in the current data storage fields and at least one associated data block in the boundary current data storage field.

7. he method of claim 6, wherein the boundary current data storage field is adjacent the current data storage field on the data storage device.

8. he method of claim 1, wherein the step of changing the specified saved data is part of a read/modify/write operation.

9. he method of claim 1, wherein the current data storage fields include corresponding sectors of the data storage device, and the sectors store the specified saved data having blocks of data, and at least one block of data for storing the specified saved data being stored in the boundary current data storage field with unassociated data to the specified saved data.

10. he method of claim 9, wherein the step of saving data includes using data blocks in the current data storage fields, and data blocks are stored in at least two adjacent data storage fields to the current data storage fields in the data storage device.

11. data retrieval system, comprising:
a data storage device in a computer;
a plurality of data storage fields for saving data in the data storage device using the computer, and the data being saved using a computer program embodied in a non-transitory computer readable medium in the computer being readable by the computer;
a plurality of current data storage fields having specified data; a boundary data storage field having part of the specified data and unassociated data to the specified data; and
at least one back-up data storage field location in the data storage device for storing a copy of all the data in the boundary data storage field including the specified data and the unassociated data;
when modifying the read specified saved data including the copied data from the boundary current data storage field storing a copy of new data which corresponds to the boundary current data storage field in the back-up data storage field location;
wherein the data storage device copies the specified saved data within a revolution of a disk drive, and stores a copy of a new data within the revolution of the disk drive including the copying of the specified saved data;
the data storage device being a hard drive having a period of revolution, wherein during the period of revolution of the hard drive, the steps of reading the specified saved data, copying all the data in the boundary current data storage field, and storing the copy of the new data are completed, and during a next revolution of the hard drive, the specified saved data is changed.

12. he system of claim 11, wherein the specified data includes data blocks in the current data storage fields and at least one associated data block in the boundary data storage field of the data storage device.

13. he system of claim 12, wherein the boundary data storage field is adjacent the current data storage fields on the data storage device.

14. he system of claim 11, wherein the copy of all the data in the boundary data storage field is retrieved after losing power to the data storage device during a data changing operation.

15. he system of claim 14, wherein the data changing operation includes a read/modify/write operation.

16. he system of claim 11, wherein the current data storage fields include sectors of the data storage device, and the sectors store the specified data having blocks of data, and at least one block of data for storing the specified data being stored in a boundary sector of the data storage device.

17. he device of claim 11, wherein the saved specified data is stored using data blocks stored in at least two adjacent boundary data storage fields to the current data storage fields in the data storage device.

18. A computer program product for use with a computer, the computer program product including a non-transitory computer readable medium having recorded thereon a computer program or program code for causing the computer to perform a process for storing and retrieving data, the process comprising:
saving data in current data storage fields of a data storage device in a computer;
receiving additional data for modifying specified saved data in the current data storage fields;
analyzing data storage space in storage fields of the data storage device; selecting a back-up data storage field location in the data storage device;
reading the specified saved data in the current data storage fields on the data storage device including the specified saved data stored in part of a boundary current data storage field;
copying all data in the boundary current data storage field;
modifying the read specified saved data including the copied data from the boundary current data storage field resulting in new data which includes the boundary current data storage field;
storing a copy of the new data corresponding to the boundary current data storage field in the back-up data storage field location;
changing the specified saved data at the current data storage fields and the boundary current data storage field including the new data after storing the new data;
copying the specified saved data within a revolution of a disk drive; and
storing the copy of the new data within the revolution of the disk drive with the copying of the specified saved data;
wherein the data storage device is a hard drive having a period of revolution, and the process further includes:
during the period of revolution of the hard drive, completing the steps of reading the specified saved data, copying all the data in the boundary current data storage field, and storing the copy of the new data; and
during a next revolution of the hard drive, changing the specified saved data.

* * * * *